(12) United States Patent
Froelich

(10) Patent No.: US 7,911,096 B2
(45) Date of Patent: Mar. 22, 2011

(54) ELECTROMAGNETIC OSCILLATOR WITH ELECTRICAL AND MECHANICAL OUTPUT

(76) Inventor: Michael J. Froelich, North Canton, OH (US)

(*) Notice: Subject to any disclaimer, the term of this patent is extended or adjusted under 35 U.S.C. 154(b) by 474 days.

(21) Appl. No.: 11/977,059

(22) Filed: Oct. 23, 2007

(65) Prior Publication Data

US 2008/0111432 A1    May 15, 2008

Related U.S. Application Data

(60) Provisional application No. 60/857,944, filed on Nov. 9, 2006.

(51) Int. Cl.
*H02K 7/06* (2006.01)

(52) U.S. Cl. .......................................................... 310/80

(58) Field of Classification Search .................... 310/36, 310/37, 80, 103, 104, 126
See application file for complete search history.

(56) References Cited

U.S. PATENT DOCUMENTS

| | | | | |
|---|---|---|---|---|
| 3,108,163 A | * | 10/1963 | Kripke et al. | 200/61.46 |
| 3,899,703 A | * | 8/1975 | Kinnison | 310/103 |
| 3,967,146 A | * | 6/1976 | Howard | 310/80 |
| 4,169,983 A | * | 10/1979 | Felder | 310/46 |
| 4,179,633 A | | 12/1979 | Kelly | |
| 4,751,486 A | * | 6/1988 | Minato | 335/272 |
| 5,405,251 A | * | 4/1995 | Sipin | 417/420 |
| 6,084,322 A | * | 7/2000 | Rounds | 310/46 |
| 6,781,270 B2 | * | 8/2004 | Long | 310/90.5 |
| 7,151,332 B2 | | 12/2006 | Kundel | |
| 7,385,325 B2 | * | 6/2008 | Tkadlec | 310/80 |
| 2004/0041479 A1 | * | 3/2004 | French | 310/105 |
| 2007/0210659 A1 | * | 9/2007 | Long | 310/80 |

* cited by examiner

*Primary Examiner* — Nguyen N Hanh
(74) *Attorney, Agent, or Firm* — Sand & Sebolt

(57) ABSTRACT

An oscillator typically includes several pivotable oscillating arms each having a drive magnet and a follower magnet thereon so that the drive magnet on one arm drives movement of the follower magnet on another arm to oscillatingly pivot the other arm. Typically, a first repelling magnet is mounted on each oscillating arm and two repelling magnets are positioned on opposite sides of the first repelling magnet to facilitate the pivotal oscillation of the oscillating arm. A rotatable flywheel with a drive magnet thereon may drive movement of the follower magnet on one of the arms to drive pivotal movement of that arm. An electric motor may be used to drive rotation of the flywheel. A generating magnet may be mounted on each oscillating arm and movable adjacent an electrically conductive coil for producing an electric current therein. The coil may be in electrical communication with the motor.

20 Claims, 13 Drawing Sheets

ELECTROMAGNETIC OSCILLATOR WITH ELECTRICAL AND MECHANICAL OUTPUT

CROSS REFERENCE TO RELATED APPLICATIONS

This application claims priority from U.S. Provisional Application Ser. No. 60/857,944 filed Nov. 9, 2006; the disclosure of which is incorporated herein by reference.

BACKGROUND OF THE INVENTION

1. Technical Field

The present invention relates generally to the generation of electricity and the production of mechanical output. More particularly, the invention relates to a higher efficiency generation of electrical power.

2. Background Information

The efficient generation of electrical current and its use for driving mechanical motion which creates the electrical current has been a long sought after goal. While the loss of energy in accordance with the second law of thermodynamics is well known, nonetheless there is always room for improvement in seeking a higher efficiency in such a device. The present invention provides such an improvement.

BRIEF SUMMARY OF THE INVENTION

The present invention provides an apparatus comprising: a first pivotable oscillating arm; a drive magnet on the first arm; a second pivotable oscillating arm; and a follower magnet on the second arm movable in response to movement of the first arm drive magnet for oscillatingly pivoting the second arm.

DETAILED DESCRIPTION OF THE INVENTION

Figure 13:
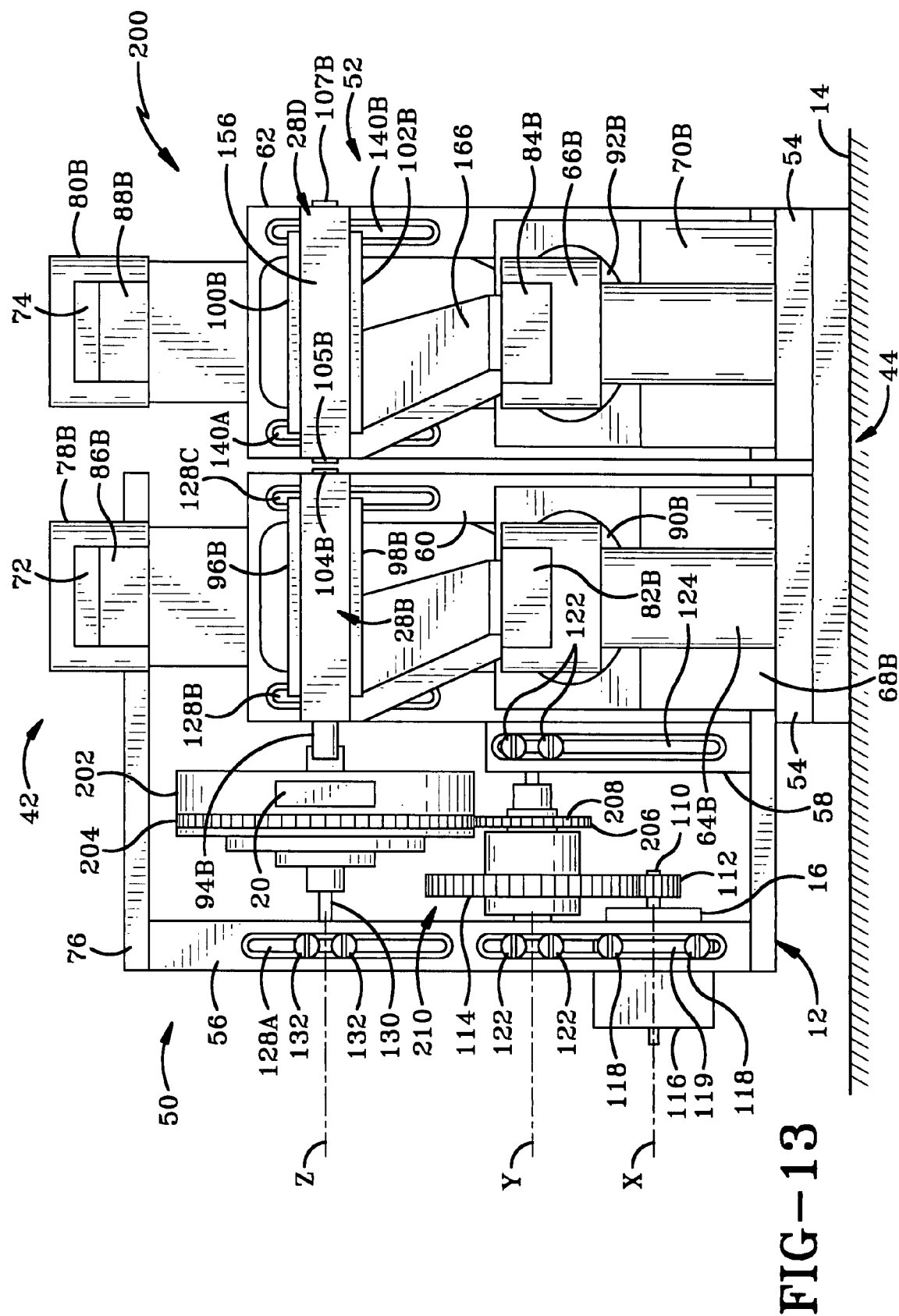
FIG. 13 is a side elevational view of a second embodiment of the present invention similar to FIG. 4 as showing an alternate drive mechanism.

A first embodiment of the oscillator of the present invention is indicated generally at 10 in FIGS. 1-5; and a second embodiment of the oscillator of the of the present invention as indicated generally at 200 in FIG. 13. Oscillator 10 is configured to be driven by an electric motor to create mechanical motion which generates electricity. More particularly, oscillator 10 includes a frame 12 securely mounted on a support surface 14 so that frame 12 will remain stationary during operation. An electric motor 16 is mounted on frame 12 for driving a rotatable fly wheel 18 having a pair of drive magnets 20 mounted thereon in diametrical opposition to one another. An electric DC power source 22 is in electrical communication with motor 16 via conductors 24 which form an electrical circuit which is openable and closable by a switch 26. Oscillator 10 is configured so that rotation of fly wheel 18 causes oscillation of oscillating arms 28A-D (FIG. 7) so that generating magnets 30 (FIG. 8) mounted respectively on arms 28 move through respective electrically conductive coils 90 and 92 (FIGS. 4, 5, 8) to produce an alternating current which flows through conductors 34 to a bridge rectifier 36. Rectifier 36 changes the alternating current to a direct current which may be passed through conductors 38 in electrical communication with motor 16 via an electric circuit comprising a switch 40.

Figure 3:
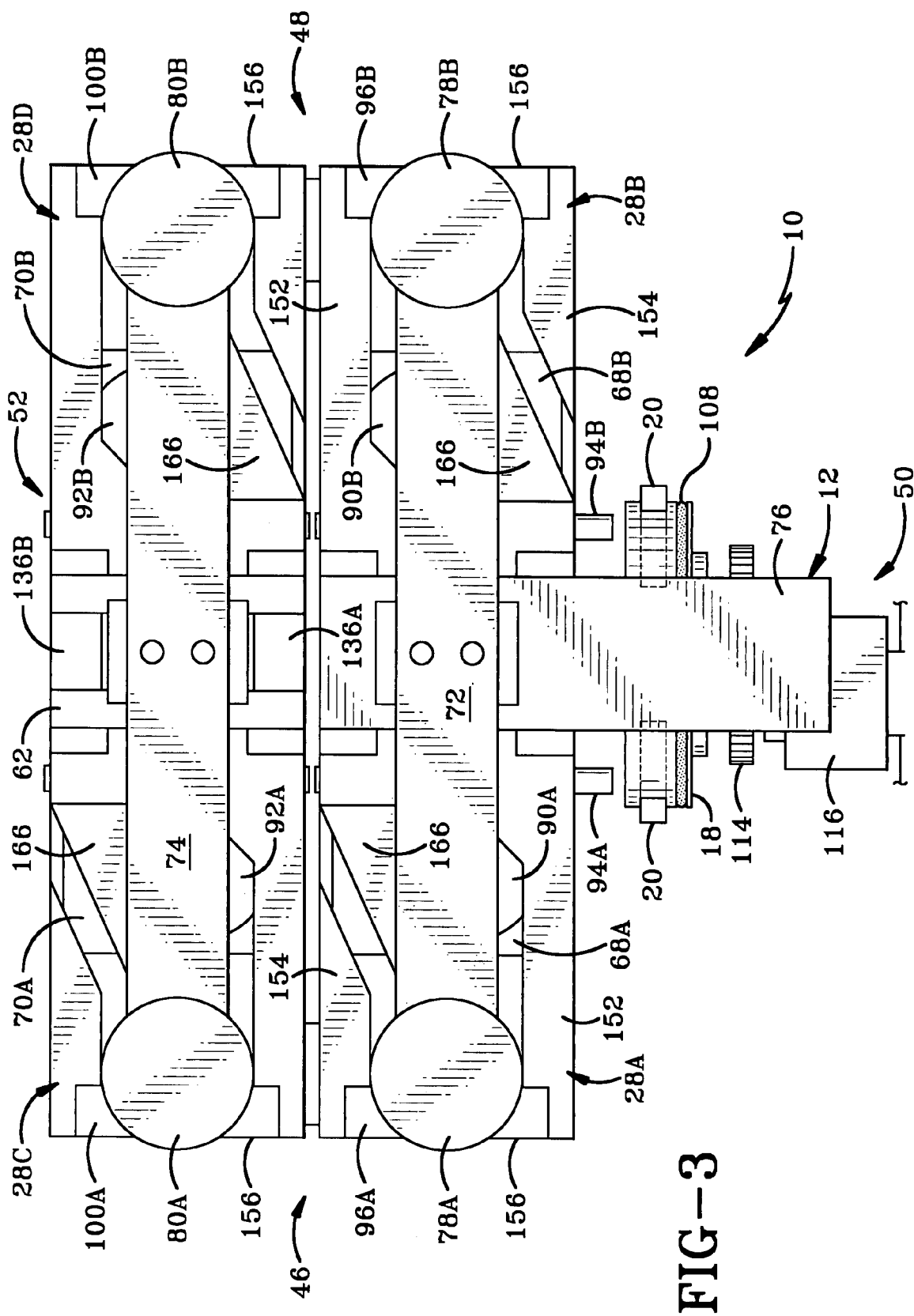
FIG. 3 is a top plan view of the oscillator.
Figure 4:
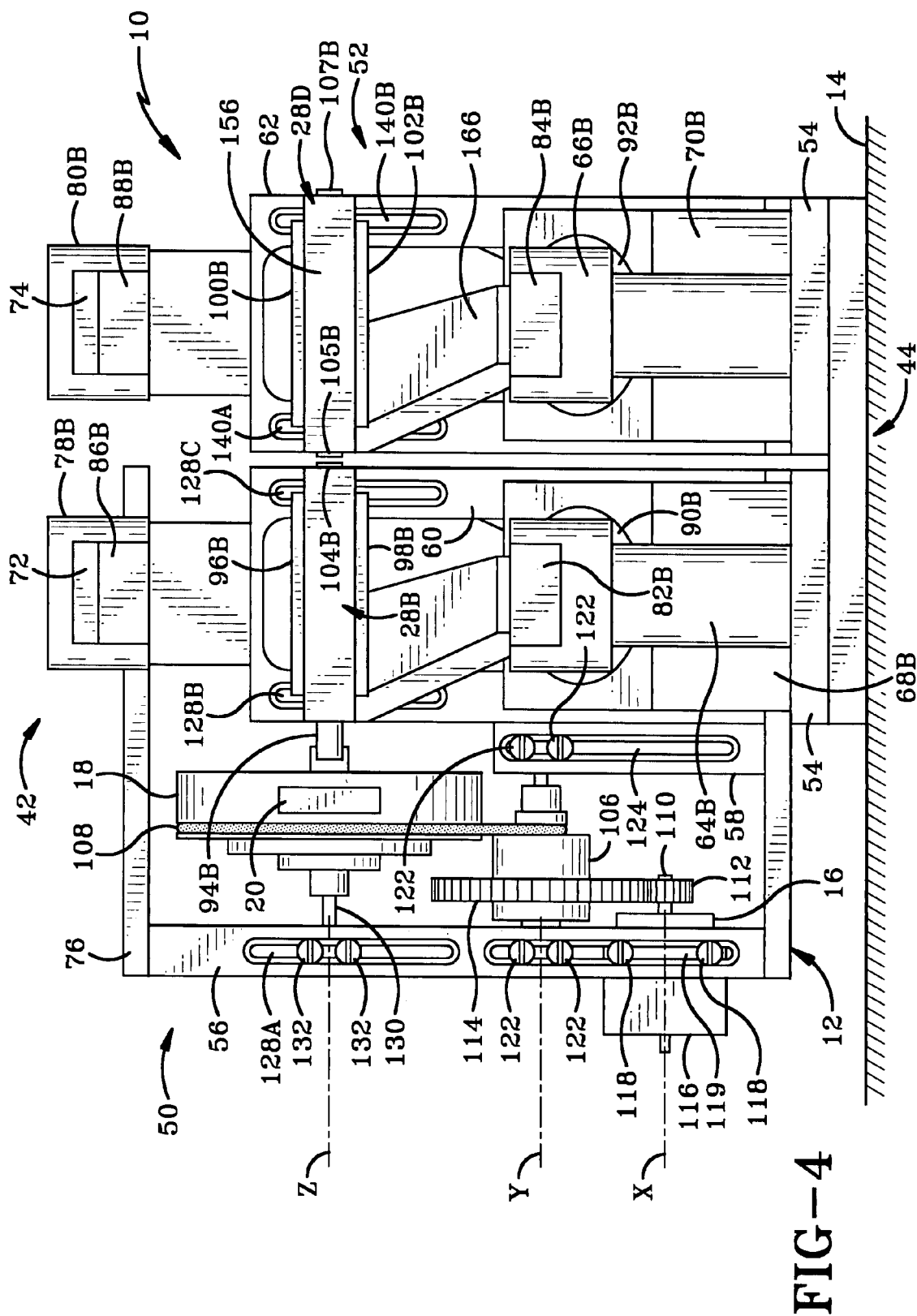
FIG. 4 is a side elevational view of the oscillator as viewed from the right side of FIG. 1.
Figure 5:
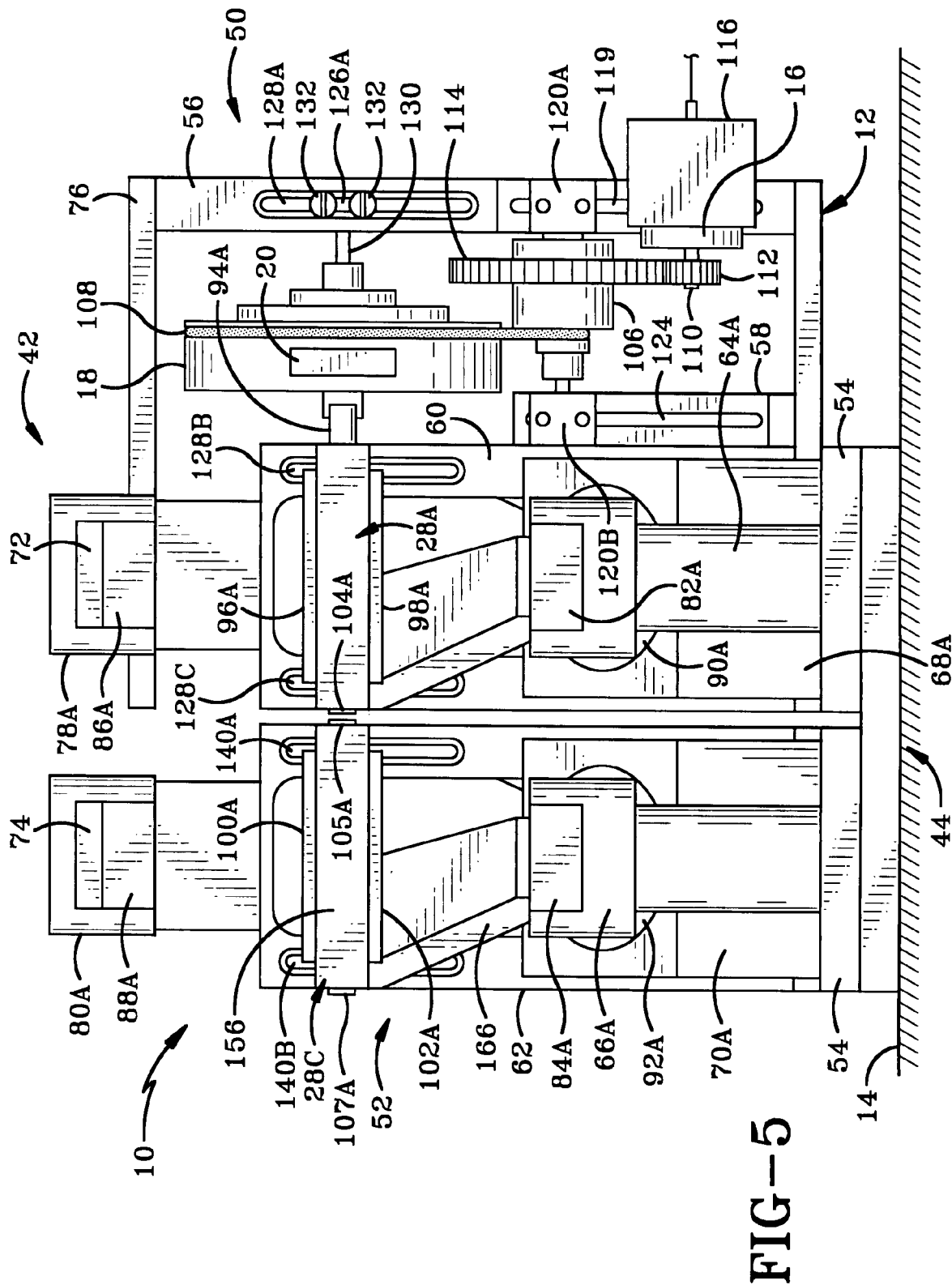
FIG. 5 is a side elevational view as viewed from the left side of FIG. 1.
Figure 6:
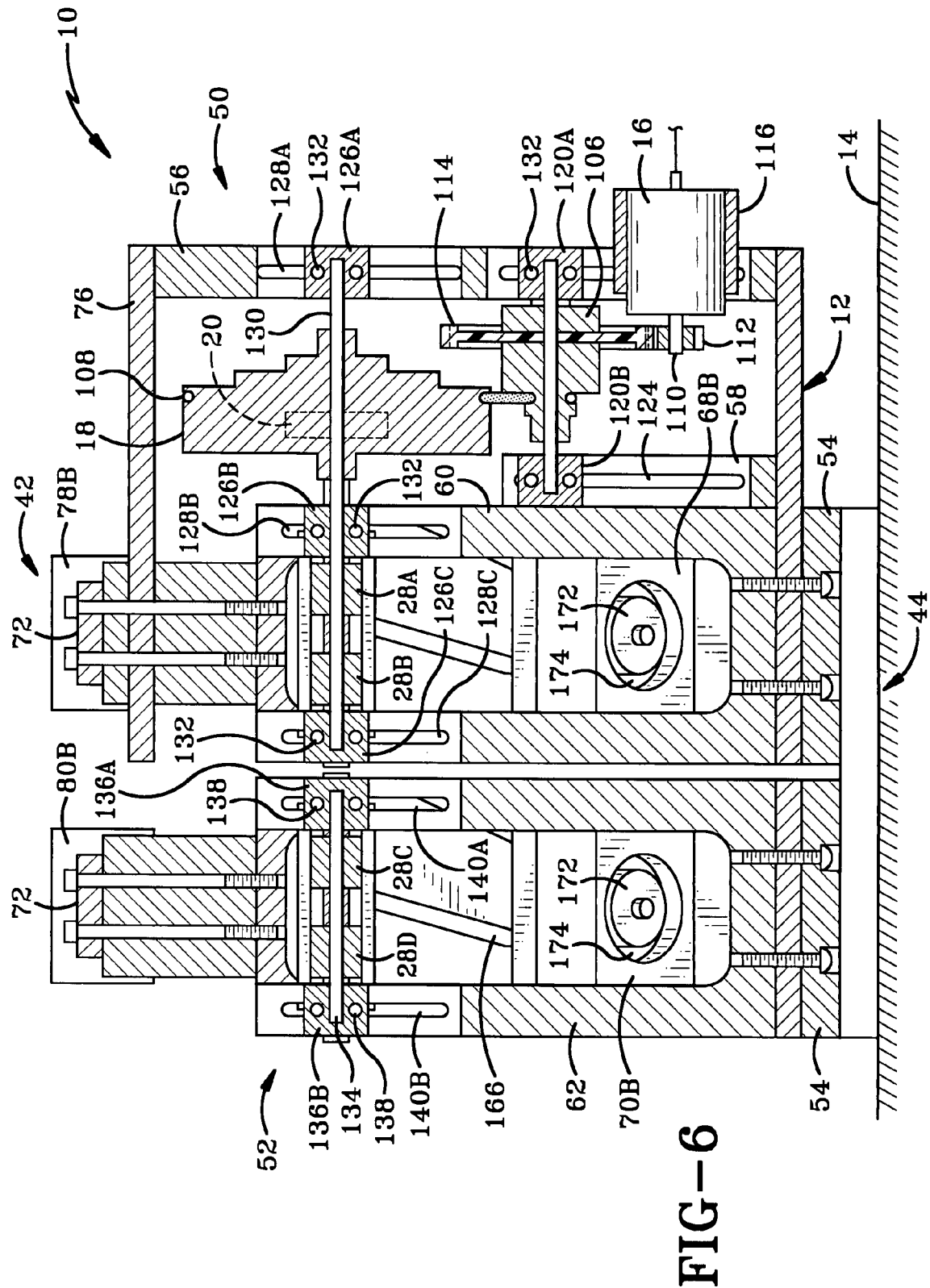
FIG. 6 is a sectional view taken on line 6-6 of FIG. 1.

Oscillator 10 has a top 42, a bottom 44 seated on surface 14, first and second opposed sides 46 and 48, a front 50 and a rear 52 (FIGS. 3-5). Frame 12 includes a base 54 adjacent bottom 44. Frame 12 further includes first, second, third and fourth central mounts 56, 58, 60 and 62 which project upwardly from and are rigidly mounted on base 54 respectively from adjacent front 50 to adjacent rear 52, (FIGS. 4-6). First and second front magnet mounts 64A and 64B (FIG. 1) extend upwardly from base 54 respectively adjacent sides 46 and 48. Likewise, first and second rear magnet mounts 66A and 66B (FIG. 2) project upwardly from base 54 rearwardly of mount 64 and respectively adjacent sides 46 and 48.

First and second front coil mounts 68A and 68B (FIG. 1) project upwardly from base 54. More particularly, mount 68A is disposed between central mount 60 and magnet mount 64A while mount 68B is disposed between central mount 60 and magnet mount 64B. Similarly, rear coil mounts 70A and 70B (FIG. 2) project upwardly from base 54 so that mount 70A is disposed between central mount 62 and magnet mount 66A while mount 70B is disposed between central mount 62 and magnet mount 66B. Front and rear upper supports or crossbars 72 and 74 (FIG. 3) are respectively mounted atop central mounts 60 and 62 and extend laterally outwardly in opposite directions therefrom toward first side 46 and second side 48. A front upper support 76 is mounted on front crossbar 72 and extends forward therefrom to connect to the upper end of central mount 56. Upper front magnet mounts 78A and 78B are mounted on the free ends of crossbar 72 respectively adjacent sides 46 and 48. Likewise, upper rear magnet mounts 80A and 80B (FIG. 3) are mounted adjacent free ends of crossbar 74 respectively adjacent sides 46 and 48.

Lower front repelling magnets 82A and 82B are mounted respectively atop magnet mounts 64A and 64B. Likewise, lower rear repelling magnets 84A and 84B (FIG. 2) are mounted respectively atop magnet mounts 66A and 66B. Upper front repelling magnets 86A and 86B are mounted respectively on the bottom of magnet mounts 78A and 78B. Likewise, upper rear repelling magnets 88A and 88B (FIG. 2) are mounted respectively on the bottom of magnet mounts 80A and 80B. First and second front electrically conductive coils 90A (FIG. 5) and 90B (FIG. 4) are respectively mounted on coil mounts 68A and 68B. Likewise, rear electrically conductive coils 92A (FIG. 5) and 92B (FIG. 4) are respectively mounted on coil mounts 70A and 70B. Follower magnets 94A and 94B (FIGS. 1, 3, 7) are mounted on oscillating arm 28A and are aligned with drive magnets 20 during rotation of fly wheel 18.

Front upper drive magnets 96A and 96B are mounted respectively atop oscillating arms 28A and 28B adjacent with respective outer ends thereof and respectively aligned below upper repelling magnets 86A and 86B. Likewise, front lower drive magnets 98A and 98B are mounted respectively on the bottom of arms 28A and 28B directly below drive magnets 96A and 96B and respectively above repelling magnets 82A and 82B. Rear upper follower magnets 100A and 100B (FIG. 2) are mounted respectively atop oscillating arms 28C and 28D adjacent outer ends thereof and respectively below repelling magnets 88A and 88B. Likewise, rear lower follower magnets 102A and 102B are mounted respectively on the bottom of arms 28C and 28D respectively above repelling magnets 84A and 84B. When the oscillating arms are at rest, upper drive magnets 96A and 96B are respectively aligned with upper follower magnets 100A and 100B while lower drive magnets 98A and 98B are respectively aligned with lower follower magnets 102A and 102B. Follower magnets 104A and 104B (FIG. 7) are mounted on arm 28B respectively adjacent and spaced from drive magnet 94A and 94B, being aligned therewith when oscillating arms 28A and 28B are at rest.

Figure 7:
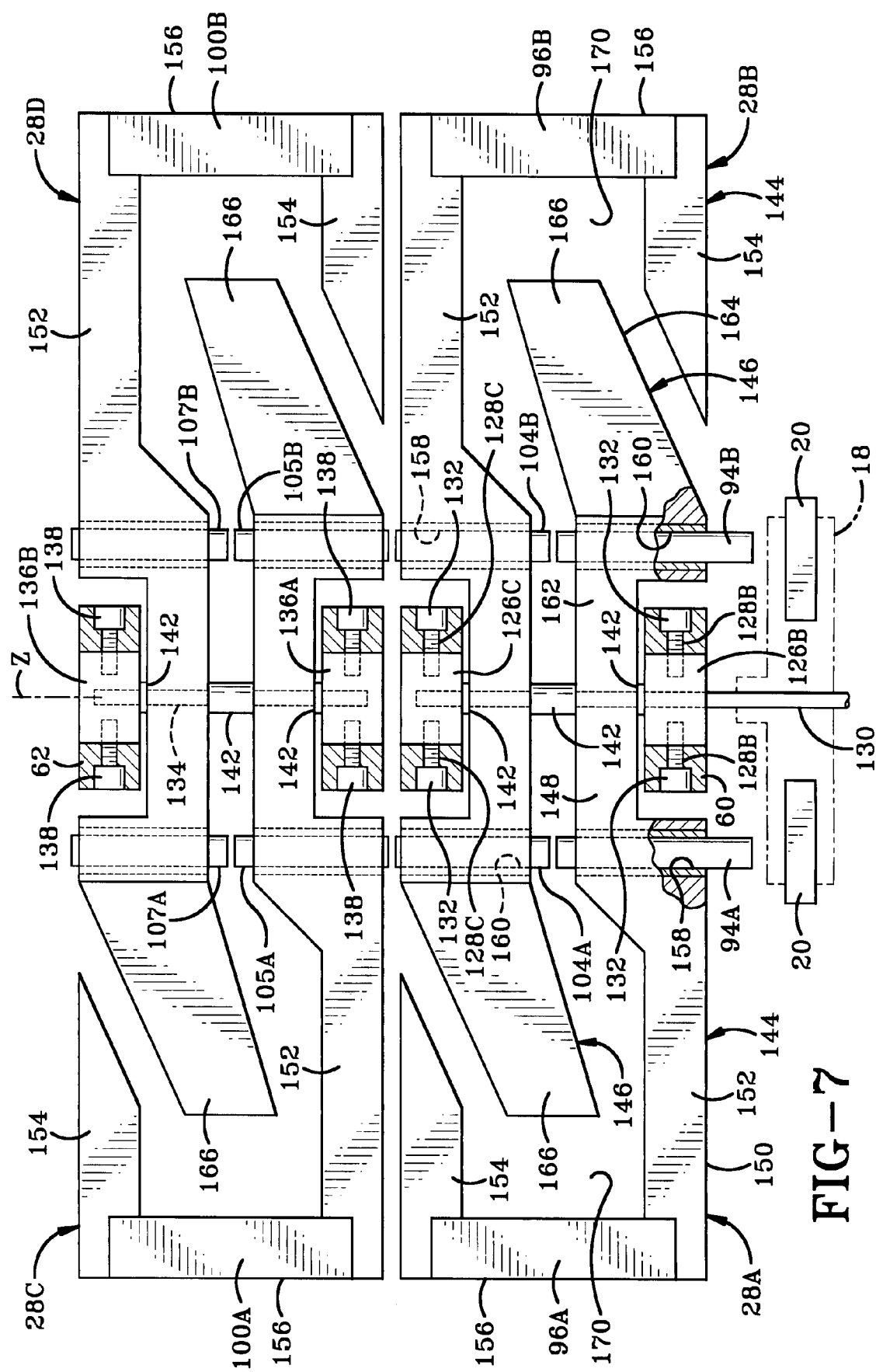
FIG. 7 is a sectional view taken on line 7-7 of FIG. 1 with some of the lower structures removed to show the oscillating arms with greater clarity and the fly wheel in phantom.

As best shown in FIG. 7, follower magnets 105A and 105B are mounted on oscillating arm 28C on opposite sides of the axis Z. Likewise, follower magnets 107A and 107B are mounted on oscillating arm 28D on opposite sides of axis Z. Like magnets 94 and magnets 104, magnets 105A and B are equidistant from axis Z, as are magnets 107A and 107B. Also like magnets 94 and 104, magnets 105 and 107 extend all the way through the through holes formed in arms 28C and 28D for respectively receiving said magnets. When oscillating arms 28B and 28C are at rest, magnets 105A and 105B are respectively adjacent and spaced from magnets 104A and 104B and aligned therewith on the opposite ends of magnets 104 from magnets 94. Likewise, when arms 28C and 28D are at rest magnets 107A and 107B are respectively adjacent and spaced from magnets 105A and 105B and aligned therewith on the opposite ends of magnets 105 from magnets 104. Thus, oscillator 10 is configured with an inner set of magnets on the oscillating arms 28 and an outer set of magnets on the oscillating arms 28. More particularly, these inner magnets include magnets 94, 104, 105 and 107 while the outer magnets includes magnets 96, 98, 100 and 102. The inner magnets are disposed radially inwardly of the outer magnets and thus closer to axis Z. When oscillator 10 is at rest, magnets 94A, 104A, 105A and 107A are collinear along a line parallel to axis Z. Likewise, magnets 94B, 104B, 105B and 107B lie along a common line parallel to axis Z when oscillator 10 is at rest. Similarly, magnets 96A and 100A lie along a common line parallel to axis Z when oscillator 10 is at rest, as do respectively magnets 96B and 100B, magnets 98A and 102A, and magnets 98B and 102B. In addition, the inner magnets all lie in a first common plane with axis Z when oscillator 10 is at rest. Outer magnets 96A, 96B, 100A and 100B also lie in a second common plane which is parallel to and above the first plane. Similarly, magnets 98A, 98B, 102A and 102B lie in a third common plane parallel to the other two planes and below the first plane when oscillator 10 is at rest.

Referring to FIGS. 4-5, the drive mechanism which includes motor 16 and fly wheel 18 is described in further detail. The drive mechanism further includes a belt drive 106 for driving a belt 108 to drive fly wheel 18. Motor 16 includes a rotational output shaft 110 with a small diameter gear wheel or pinion 112 mounted thereon. Shaft 110 and pinion 112 are rotatable about an axis X, belt drive 106 is rotatable about an axis Y and fly wheel 18 is rotatable about an axis Z all of which are parallel to one another. Belt drive 106 includes a larger diameter gear wheel 114 which engages and is driven by pinion 112. Belt 108 may be disposed in respective grooves of belt drive 106 and fly wheel 108 or may include teeth for respectively engaging teeth formed on drive 106 and fly wheel 18 to provide more positive traction. Any suitable mechanism for driving flywheel 18 may be used.

Referring to FIG. 4, motor 16 is mounted on a vertically adjustable motor mount 116 via screws 118 which pass through a slot 119 formed in central mounted on front and rear vertically adjustable mounts 120A and 120B (FIG. 5) via a plurality of screws 122 (FIG. 4). A pair of screws 122 pass through slot 119 and threadably engage mount 120A while a pair of screws 122 pass through a slot 124 formed in mount 58 to threadably engage mount 120B. Referring to FIG. 6, fly wheel 18 is mounted on a rod 130 which is mounted on vertically adjustable mounts 126A, 126B and 126C via respective screws 132 which pass through respective slots 128A, two of which are formed in forked arms of central mount 56, slots 128B, two of which are formed in forward forked arms of central mount 60 and slots 128C, two of which are formed in rear forked arms of central mount 60.

As shown in FIGS. 6 and 7, oscillating arms 28A and 28B are rotatably mounted on rod 130. Likewise, arms 28C and 28D are rotatably mounted on a rod 134 which is mounted on vertically adjustable mounts 136A and 136B via screws 138 which pass through a pair of front slots 140A formed in front forked arms of central mount 62 and a pair of rear slots 140B formed in a rear forked arm of central mount 62. Various spacers 142 are mounted on rods 130 and 134 to provide the appropriate spacing between mounts 60 and 62 and arms 28. Various bearings (not shown) may be used in the rotational mounting of the various rotatable members such as arms 28 in order to minimize frictional engagement during rotation.

Oscillating arms 28 are described in further detail with reference to FIGS. 1 and 7. Each arm 28 is weight balanced about axis Z in order to provide oscillation about axis Z which is as smooth as possible. Thus, each arm 28 includes first and second sides 144 and 146 having equal weights with respect to axis Z to provide this weight balance. First side 144 includes an inner portion 148 extending radially outwardly from axis Z and an outer U-shaped portion 150 having first and second legs 152 and 154 which extend from an intervening base 156 with first leg 152 connected to inner portion 148. A through passage 158 is formed in inner portion 148 of arm 28A for receiving therein magnet 94A. A passage 158 is also formed in arm 28B for receiving magnet 104B and similar passages are optionally formed in arms 28C-D for receiving magnets therein. Similarly, a through passage 160 is formed in second side 146 of arm 28A for receiving therein magnet 94B. A passage 160 is also formed in arm 28B for receiving magnet 104 and optionally, similar passages may be formed in the remaining arms 28C-D for receiving magnets therein as well.

Figure 1:
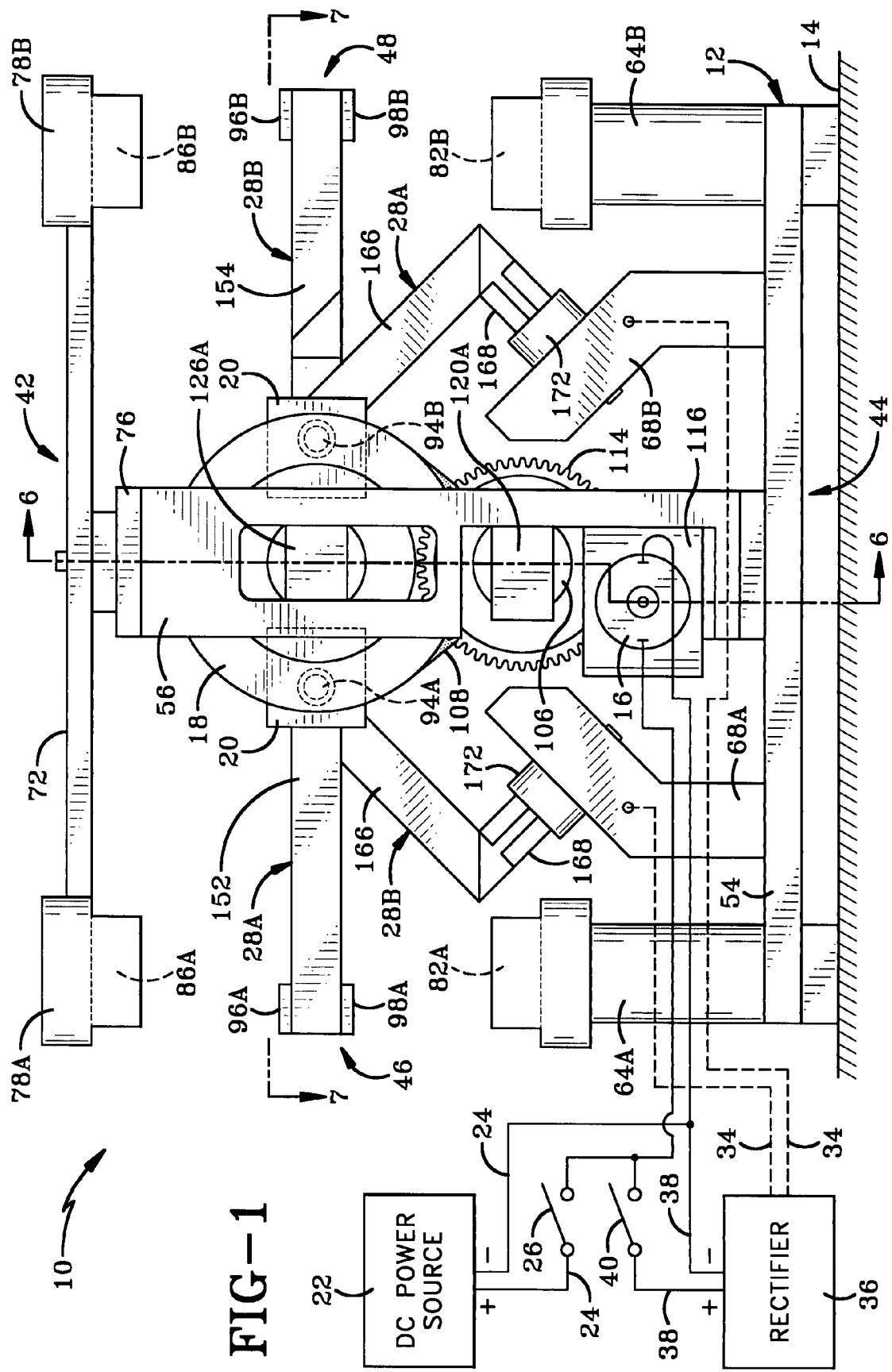
FIG. 1 is a front elevational view of the oscillator of the present invention.
Figure 2:
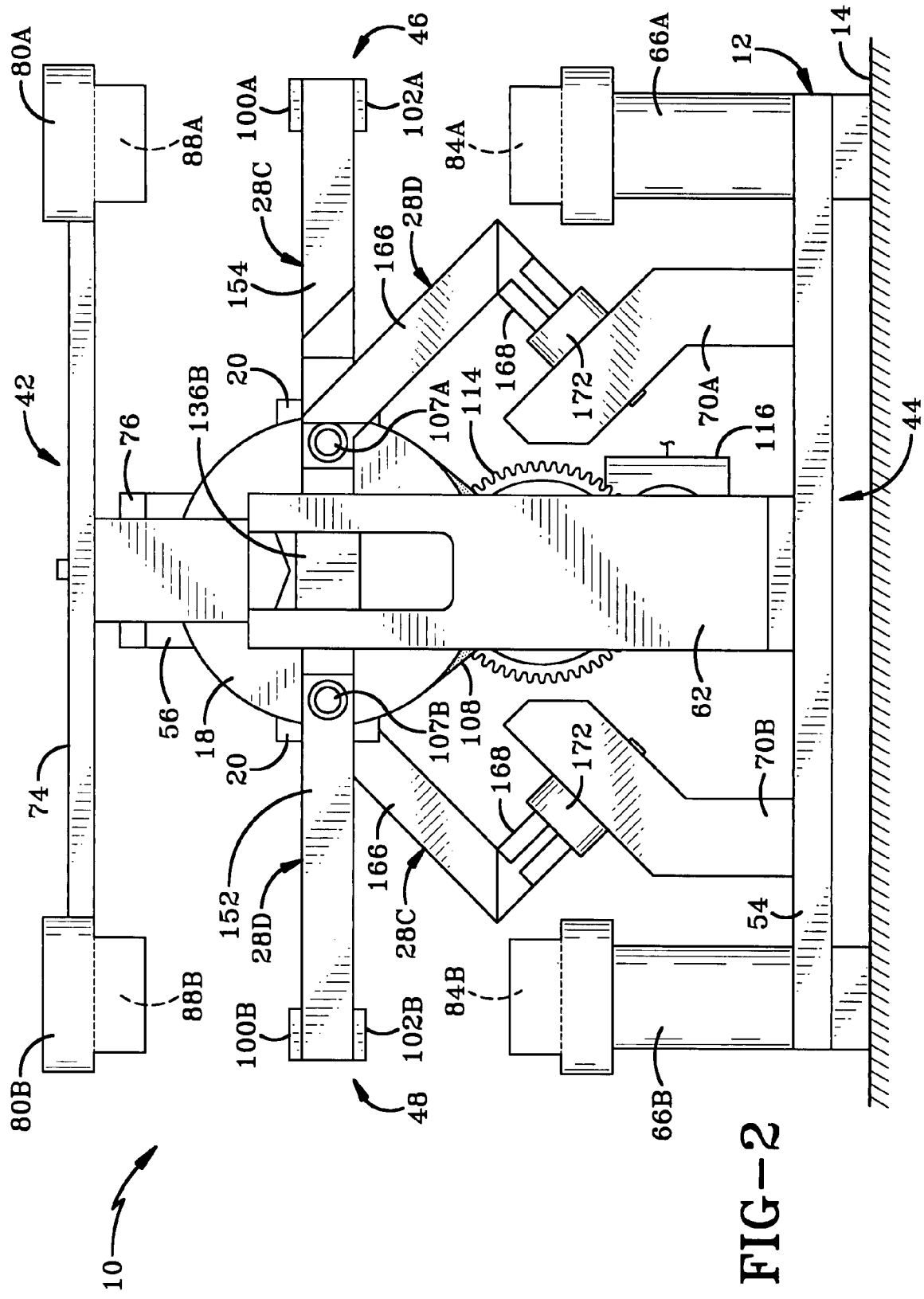
FIG. 2 is a rear elevational view of the oscillator.

Second side 146 of each arm 28 includes an inner portion 162 and an outer L-shaped portion 164 having an upper leg 166 and lower leg 168 (FIG. 1). More particularly, upper leg 166 angles radially outwardly and rearwardly from inner portion 162 so that it is disposed between legs 152 and 154 of the opposing arm 28 as viewed from above. More particularly, each first and second leg 152 and 154 define therebetween a space 170 for receiving therein upper leg 166 and possibly portions of lower leg 168 during oscillation of the respective arms 28. As shown in FIG. 1, lower leg 168 angles downwardly and inwardly from the outer end of upper leg 166 toward the central mounts. Each lower leg 168 serves as a magnet mount for respective generating magnets 30 (FIG. 8) in addition, balancing weights 172 which may or may not be magnetic are mounted on each lower leg 168 in order to provide the weight balance between first and second sides 144 and 146. As shown in FIG. 6, each coil 90 and 92 define a central opening or through passage 174 for receiving therethrough weights 172, magnet 30 and portions of lower leg 168 during the oscillating rotation of respective arms 28.

Figure 8:
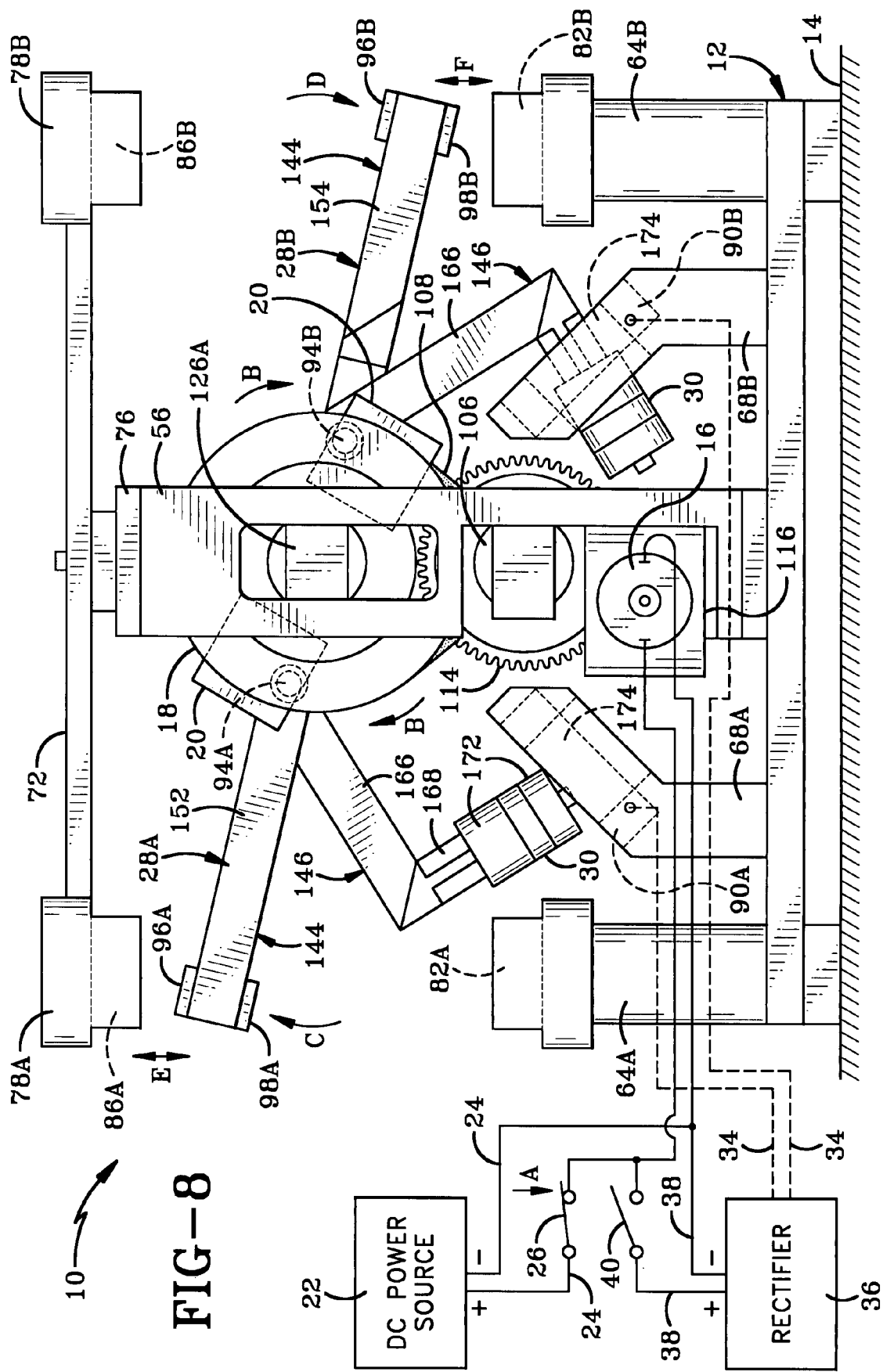
FIG. 8 is an operational view showing the motor powered by the DC power source to drive the fly wheel and move the oscillating arms.

The operation of oscillator 10 is described with reference to FIGS. 8-11. Referring to FIG. 8, switch 26 is closed as shown at arrow A in order to form a closed circuit providing electrical power between DC power source 22 and the motor 16 in order to rotate output shaft 110 and pinion 112 (FIG. 4) to drive belt drive 106 via gear wheel 114 thereof to rotate fly wheel 18 as shown at arrow B via belt 108. During the rotation of fly wheel 18, drive magnet 20 attracts follower magnets 94A and 94B in order to drive them or lead them in the respective direction that each magnet 20 is moving. Thus, if fly wheel rotates clockwise as viewed from FIG. 8, the upwardly moving magnet 20 causes follower magnet 94A to move upwardly therewith and the downwardly moving magnet causes follower magnet 94B to move downwardly therewith, thus causing the rotation of arm 28A with first side 144 thereof rotating upwardly as shown at arrow C and second side 146 necessarily rotating downwardly.

Referring to FIGS. 7-8, during the rotational movement of arm 28A, magnets 94A and 94B also serve as drive magnets which drive the movement of oscillating arm 28B by respectively attracting follower magnets 104A and 104B on arm 28B, thus causing arm 28B to rotate along with arm 28A with first side 144 of arm 28B rotating downwardly (Arrow D in FIG. 8) and second side 146 thereof rotating upwardly. During the rotation of arms 28A and 28B, the drive magnets 96 and 98 mounted thereon respectively drive or lead the follower magnets 100 and 102 (FIG. 2) mounted on arms 28C and 28D in order to cause them to rotate in a like manner. That is, arm 28C substantially follows the rotational oscillating path of arm 28A while arm 28D substantially follows the rotational oscillating movement of arm 28B, although the movement of each subsequent arm which is sequentially further away from drive magnet 20 and fly wheel 18 is slightly delayed with respect to the adjacent arm which drives it. In addition, during the rotation of arm 28B, magnets 104A and 104B also serve as drive magnets for driving the movement of oscillating arm 28C by respectively attracting follower magnets 105A and 105B on arm 28C, thus causing arm 28C to rotate along with arm 28B. Similarly, during the rotation of arm 28C, magnets 105A and 105B serve as drive magnets for driving the movement of oscillating arm 28D by respectively attracting follower magnets 107A and 107B on arm 28D, thus causing arm 28D to rotate along with arm 28C.

Thus, the magnetic fields of the two magnets 20 on fly wheel 18 drives the rotation of arm 28A via interaction with the respective magnetic field of the two magnets 94A and 94B. The two magnets 94A and 94B on the arm 128A via their magnetic fields in turn magnetically drive the rotation of the arm 28B via two magnets 94A and 94B. The two magnets 94A and 94B on the arm 128A via their magnetic fields in turn magnetically drive the rotation of the arm 28B via respective interaction with the magnetic fields of magnets 104A and 104B. Arm 28C is driven both by inner and outer magnets, with magnets 104A and 104B of arm 28B driving magnets 105A and 105B on arm 28C while outer magnets 96A and 98A on arm 28A respectively drive magnets 100A and 102A on arm 28C. Similarly, arm 28D is driven by inner and outer magnets. More particularly, magnets 105A and 105B on arm 28C drive magnets 107A and 107B on arm 28D while outer magnets 96B and 98B on arm 28B respectively drive magnets 100B and 102B on arm 28D. Inner magnets 105 and 107 may be removed from arms 28C and 28D so that only the outer magnets of arms 28A and 28B respectively drive arms 28C and 28D. However, the additional use of inner magnets 105 and 107 provides a stronger magnetic drive between arms 28B and 28C as well as between arms 28C and 28D.

As first side 144 of arm 28A moves upwardly, magnet 96A approaches magnet 86A. Magnets 86A and 96A are positioned to provide a repelling force between one another as indicated at arrow E in FIG. 8. Likewise, as first side 144 of arm 28D rotates downwardly, magnet 98B approaches magnet 82B. Magnets 82B and 98B are also configured to provide a repelling force therebetween as shown at arrow F in FIG. 8. The repelling forces indicated at arrows E and F in FIG. 8 thus help repel or drive arms 28A and 28B in the opposite direction as indicated respectively at arrows G and H in FIG. 9. respectively similar to that of arms 28A and 28B. Simultaneously, the motion of arm 28A helps to drive the motion of arm 28C via attraction between magnets 96A and 100A as well as between magnets 98A and 102A (FIG. 5). Likewise, the motion of arm 28B helps to drive the motion of arm 28D via the attraction between magnets 96B and 100B as well as between 98B and 102B (FIG. 4).

Figure 9:
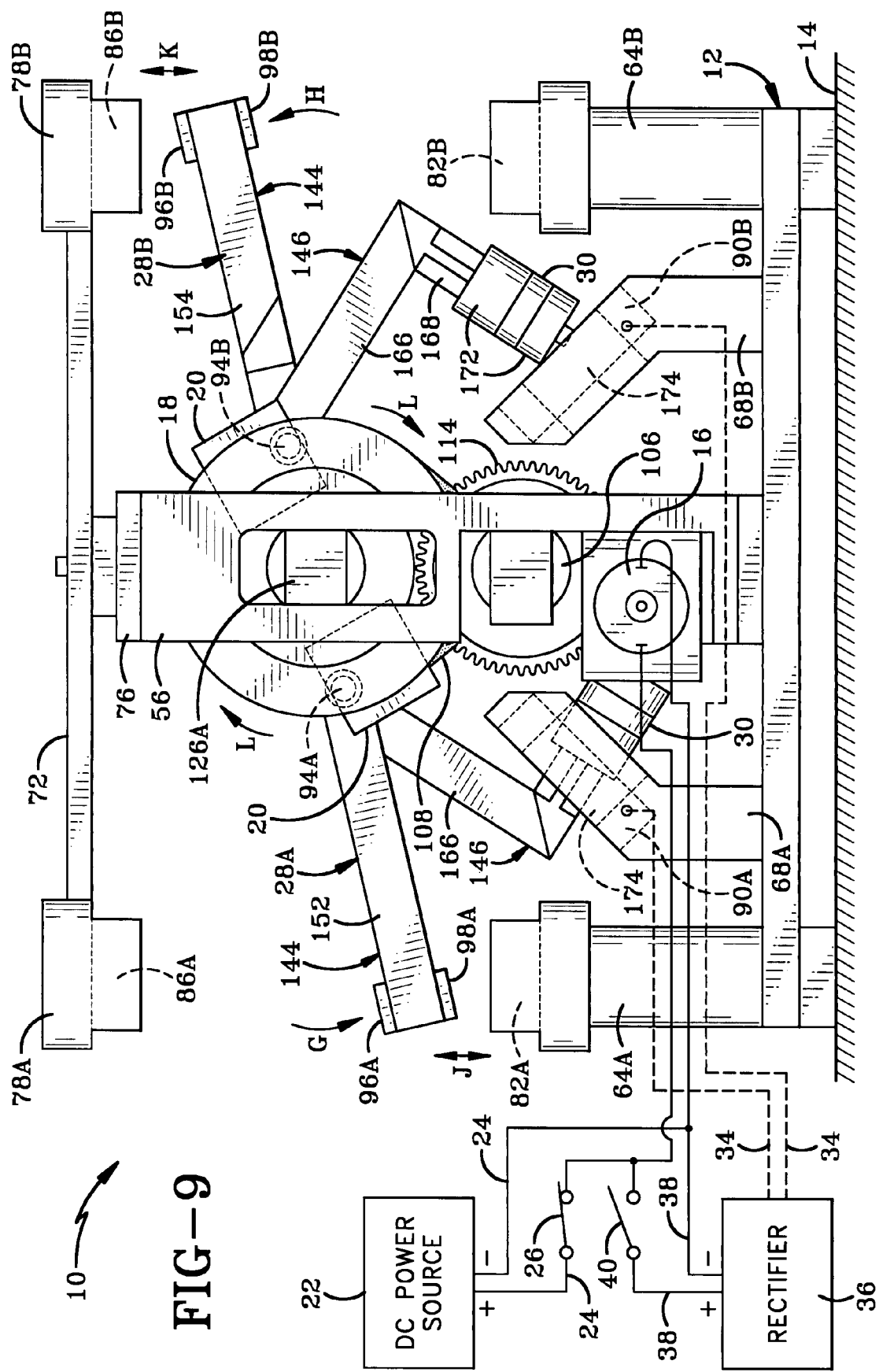
FIG. 9 is a view similar to FIG. 8 showing the oscillating arms oscillated in the opposite direction.

As shown in FIG. 9, the downward rotation of first side 144 of arm 28A causes magnet 98A to approach magnet 82A, which repels magnet 98A as indicated at arrow J in FIG. 9 to help drive arm 28A in the opposite direction as shown in FIG. 8. Likewise, the upward movement of first side 144 of arm 28B causes magnet 96B to approach magnet 86B, causing repulsion therebetween as indicated at arrow K in FIG. 9, thus also helping to drive the rotational motion of arm 28B in the opposite direction as shown in FIG. 8. Meanwhile, motor 16 continues to rotationally drive fly wheel 18 as indicated at arrow L at a rate which is suitably timed so that magnets 20 drive magnets 94A and 94B in a synchronized manner with the movement of arms 28 in order to help continue driving them along their oscillating path.

During the back and forth oscillating movement of arms 28, each generating magnet 30 moves back and forth through the respective passage 174 in the respective coil 90 in order to generate an alternating electric current which flows through conductors 34 to rectifier 36 in order to be transformed thereby into DC current. Due to the fact that each oscillating arm 28 is slightly out of oscillating phase with the next adjacent arm 28, proper electrical circuitry and controls (not shown) may be needed in order to provide a phase adjustment of the current produced by each of coils 90 and 92. This is especially true when the number of oscillating arms is substantially increased so that the first oscillating arm is substantially out of phase with the furthermost or other oscillating arms.

Figure 10:
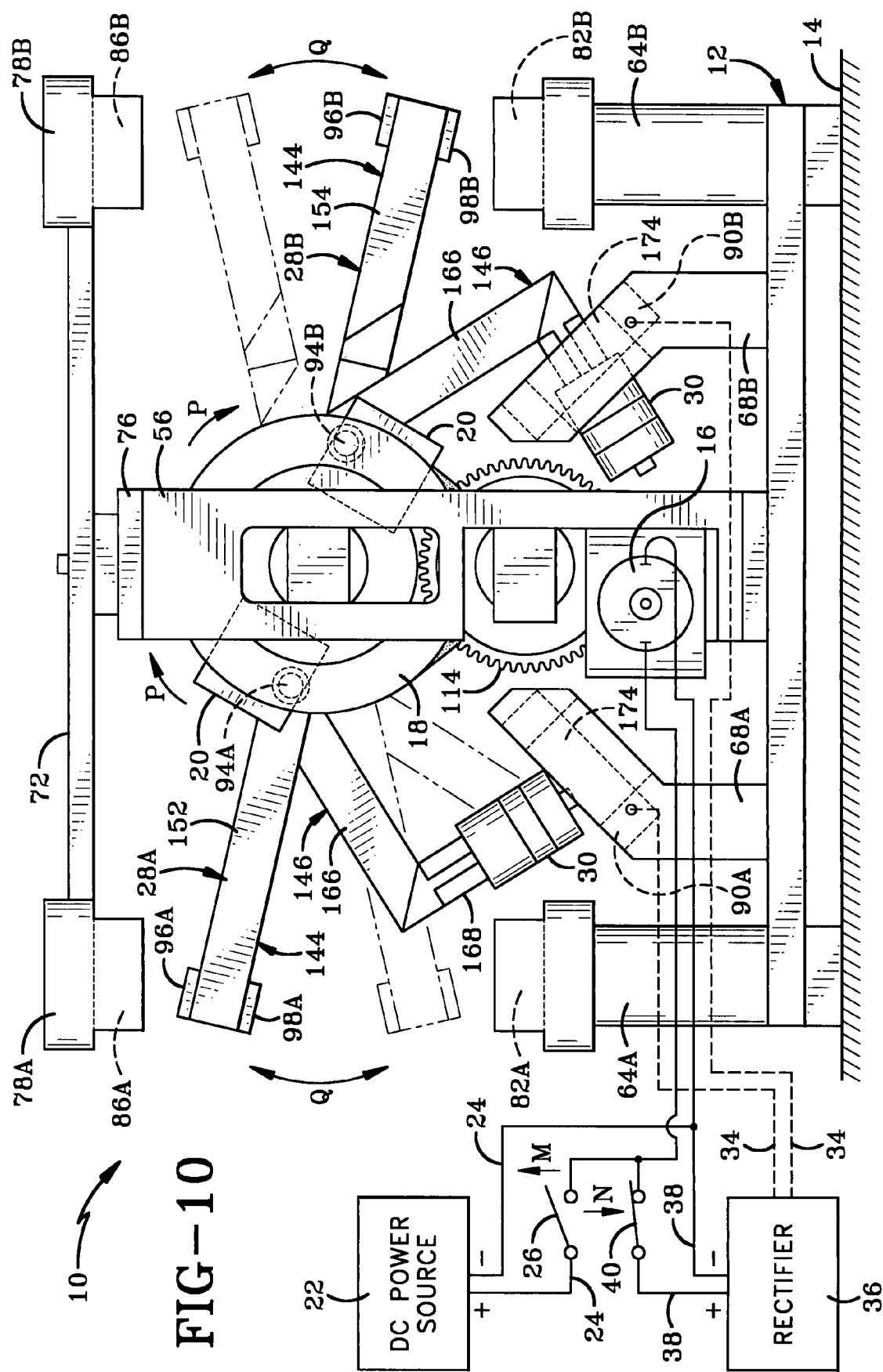
FIG. 10 is a view similar to FIG. 9 and shows the motor being powered by electricity generated via the generating magnets on the oscillating arms and the coils.
Figure 11:
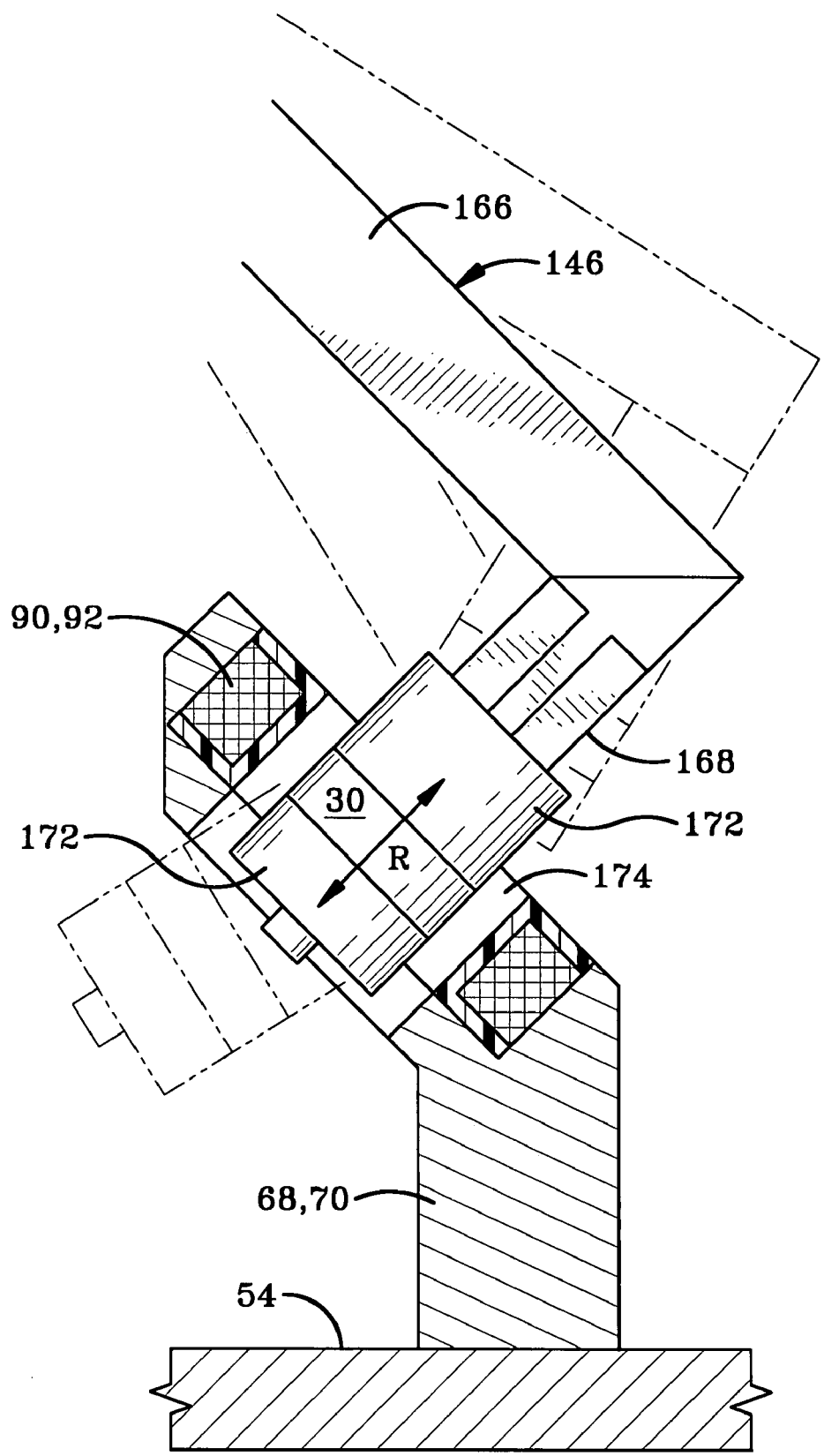
FIG. 11 is an enlarged sectional view through one of the coil mounts and coils showing the movement of the generating magnet associated therewith.

Electrical current produced within coils 30 can offset the electrical load required by a source such as source 22 in order to power motor 16. One scenario is represented in FIG. 10 wherein switch 26 is opened as indicated at arrow M and switch 40 is closed as represented at arrow N. Motor 16 must continue the rotation of fly wheel 18 as indicated at arrow P so that oscillating movement of arms 28 continues as indicated at arrow Q in accordance with the previously discussed effects of the various driving magnets, follower magnets and repelling magnets. An enlarged sectional view of FIG. 11 more clearly illustrates the movement of magnet 30 (arrow R) within one of coils 90, 92.

Figure 12:
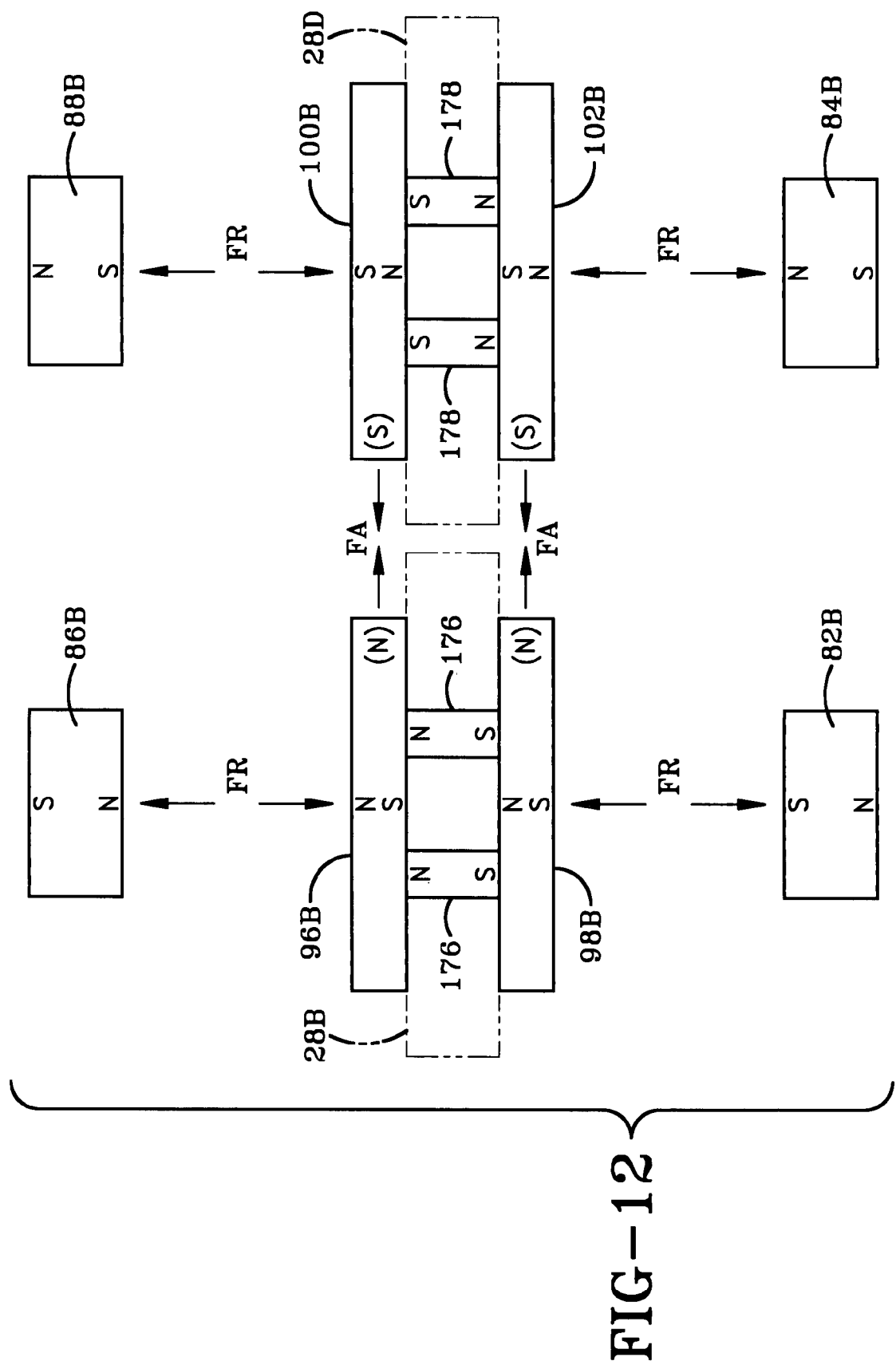
FIG. 12 is a diagrammatic view of the reacting magnets on one side of the oscillator.

FIG. 12 diagrammatically shows the arrangement of various of the magnets of oscillator 10 as viewed from second side 48, which is likewise representative of the corresponding magnets on first side 46. FIG. 12 also shows a first pair of optional magnets 176 disposed between magnets 96B and 98B and a second pair of optional magnets 178 positioned between magnets 100B and 102B. Each of the magnets shown in FIG. 12 is oriented with a north and south pole in a vertical fashion as shown in order to provide repelling forces FR and attracting forces FA as indicated by the corresponding arrows in FIG. 12. Each of magnets 96B, 98B, 100B and 102B is marked parenthetically with south or north poles on the lateral ends thereof although this is simply to illustrate that there is an attracting force between magnet 96B and magnet 100B as well as between magnet 98B and magnet 102B.

Thus, oscillator 10 provides a very efficient oscillating movement of arms 28 which is initially driven by motor 16 and powered by DC power source 22 in order to produce electrical current via generating magnets 30 and coils 90 and 92 which may be used to assist in powering motor 16.

Referring to FIG. 13, oscillator 200 is now briefly described. Oscillator 200 is similar to oscillator 10 except that the drive mechanism is somewhat different. In particular, the belt drive system of oscillator 10 has been replaced with a direct gear connection between a flywheel 202 having gear teeth 204 and a small diameter gear or pinion 206 having teeth 208 which engage teeth 204 of flywheel 202. The various gears shown in FIG. 13 provide a gear reduction unit 210 similar to the belt and gear configuration of oscillator 10. Oscillator 200 operates in the same manner as oscillator 10 except for this drive mechanism. Thus, motor 16 is operated to drive rotation of gear 112 via rotational output 110 operates in the same manner as oscillator 10 except for this drive mechanism. Thus, motor 16 is operated to drive rotation of gear 112 via rotational output 110 so that gear 112 drives gear 114. Gear 206 is mounted to rotate with gear 114 and drive the rotation of flywheel 202 so that drive magnets 20 thereon operate in the same manner as oscillator 10 to provide the oscillating movement of the various oscillating arms 28.

It is noted that the oscillating movement of arms 28 is dependent on several factors including the rate at which fly wheel 18 rotates or revolves, that is, its revolutions per minute (rpm). In addition, the mass, length and configuration of the oscillating arms, and the strength of the various magnets, polarity thereof and the spacing therebetween are factors affecting how well the oscillating arms will oscillate along with one another. Most preferably, the oscillation of arms 28 will be self starting in response to the rotation of fly wheel 18 so that each of arms 28 is driven in the previously described sequential manner and generally in phase with one another aside from the small delay between each adjacent pair of arms 28. However, depending on various factors, application of an additional force to one or more of arms 28 may be needed in order to oscillate them in sync with one another. One example of a non-self starting scenario is the rotational movement of fly wheel 18 whereby magnets 20 drive the rotation of arm 28A or arms 28A and B generally in synchronization without driving the oscillation of arms 28C and 28D in general synchronization with arms 28A and 28B. Depending on the various factors such as the rotational speed of fly wheel 18, strength of the magnets and so forth, any number of patterns of oscillating movement of arms 28 may occur. Some of these oscillating patterns may have their own value, but in the preferred embodiment, all of the oscillating arms 28 move generally in synchronization with one another aside from the small delay between adjacent pairs as previously discussed.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An apparatus comprising:
a first pivotable oscillating arm;
a drive magnet on the first arm;
a second pivotable oscillating arm; and
a follower magnet on the second arm movable in response to movement of the first arm drive magnet for oscillatingly pivoting the second arm; wherein the oscillating arms are pivotable about a common axis.

2. The apparatus of claim 1 wherein each oscillating arm is weight balanced about the axis.

3. An apparatus comprising:
a first pivotable oscillating arm;
a drive magnet on the first arm;
a second pivotable oscillating arm;
a follower magnet on the second arm movable in response to movement of the first arm drive magnet for oscillatingly pivoting the second arm;
at least one repelling magnet on one of the oscillating arms;
a first pair of repelling magnets spaced from and on opposite sides of the at least one repelling magnet for respectively repelling the at least one repelling magnet in opposite directions to respectively limit oscillating travel of the one of the oscillating arms in opposite directions.

4. The apparatus of claim 3 further comprising:
a drive magnet on the second arm;
a third pivotable oscillating arm; and
a follower magnet on the third arm movable in response to movement of the drive magnet on one of the first and second arms for oscillatingly pivoting the third arm.

5. The apparatus of claim 4 wherein the at least one repelling magnet serves as the drive magnet on the one of the first and second arms.

6. The apparatus of claim 3 further comprising:
a generating magnet on the one of the oscillating arms; and
an electrically conductive member in which an electric current is produced in response to oscillating movement of the generating magnet.

7. The apparatus of claim 6 wherein the one of the oscillating arms is pivotable about an axis and comprises first and second segments which extend radially outwardly from the axis generally away from one another; the generating magnet is on the first segment; and the at least one repelling magnet is on the second segment.

8. The apparatus of claim 6 further comprising:
a rotatable flywheel;
a drive magnet on the flywheel; and
a follower magnet on the first arm movable in response to movement of the fly wheel drive magnet for oscillatingly pivoting the first arm.

9. The apparatus of claim 8 wherein the oscillating arms and flywheel are pivotable about a common axis.

10. An apparatus comprising:
a first pivotable oscillating arm;
a drive magnet on the first arm;
a second pivotable oscillating arm;
a follower magnet on the second arm movable in response to movement of the first arm drive magnet for oscillatingly pivoting the second arm;
a rotatable flywheel;
a drive magnet on the flywheel; and a follower magnet on the first arm movable in response to movement of the flywheel drive magnet for oscillatingly pivoting the first arm.

11. The apparatus of claim 10 wherein the follower magnet on the first arm serves as the drive magnet on the first arm.

12. The apparatus of claim 10 wherein the oscillating arms and flywheel are pivotable about a common axis.

13. The apparatus of claim 10 further comprising:
an electric motor operatively connected to the flywheel for driving rotation of the flywheel.

14. The apparatus of claim 13 further comprising:
a rotational output on the motor;
a gear reduction unit operatively connected to the rotational output and the flywheel.

15. An apparatus comprising:
a first pivotable oscillating arm;
a drive magnet on the first arm;
a second pivotable oscillating arm;
a follower magnet on the second arm movable in response to movement of the first arm drive magnet for oscillatingly pivoting the second arm;
a generating magnet on one of the oscillating arms; and
an electrically conductive member in which an electric current is produced in response to oscillating movement of the generating magnet.

16. The apparatus of claim 15 wherein the oscillating arms are pivotable about a common axis.

17. The apparatus of claim 15 wherein the conductive member comprises a coil circumscribing a space; and the generating magnet is oscillatingly movable within the space.

18. The apparatus of claim 17 further comprising:
an electric motor in electrical communication with the conductive member.

19. The apparatus of claim 18 further comprising:
a rectifier in electrical communication with the motor and conductive member.

20. The apparatus of claim 18 further comprising:
a rotatable flywheel;
a drive magnet on the flywheel; and
a follower magnet on the first arm movable in response to movement of the flywheel drive magnet for oscillatingly pivoting the first arm; and
wherein the electric motor is operatively connected to the flywheel for driving rotation of the flywheel.

* * * * *